May 25, 1926.

J. E. BERGSTROM 1,585,824

MACHINE FOR PRODUCING OBJECTS WITH MILLED GROOVES

Filed August 27, 1921   3 Sheets-Sheet 1

Johan Erik Bergström Inventor

By B. Singer, Atty.

May 25, 1926.
J. E. BERGSTROM
1,585,824
MACHINE FOR PRODUCING OBJECTS WITH MILLED GROOVES
Filed August 27, 1921   3 Sheets-Sheet 2
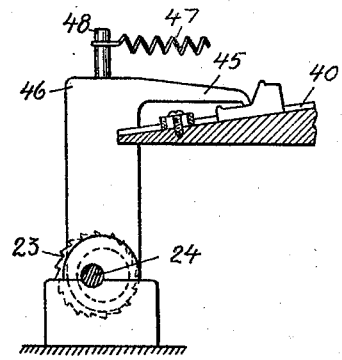
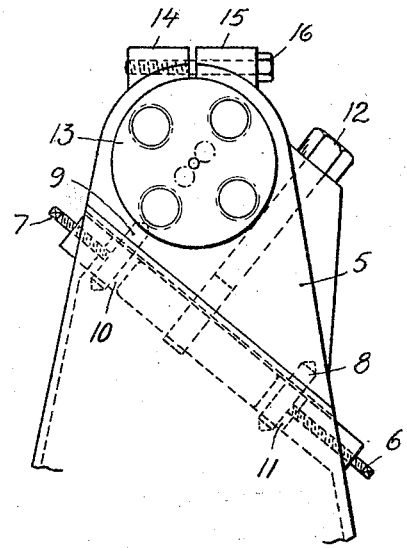
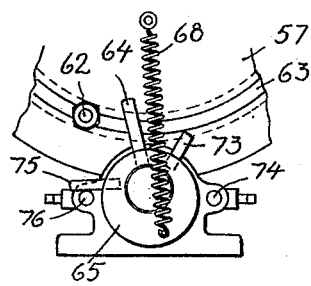
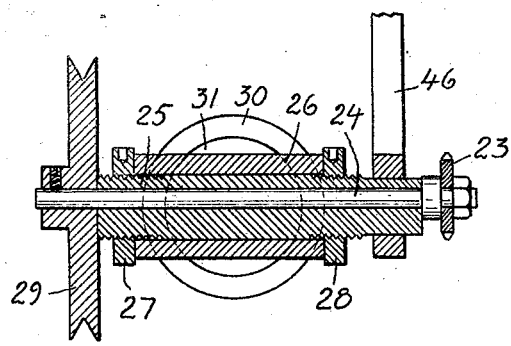

May 25, 1926. 1,585,824
J. E. BERGSTROM
MACHINE FOR PRODUCING OBJECTS WITH MILLED GROOVES
Filed August 27, 1921   3 Sheets-Sheet 3
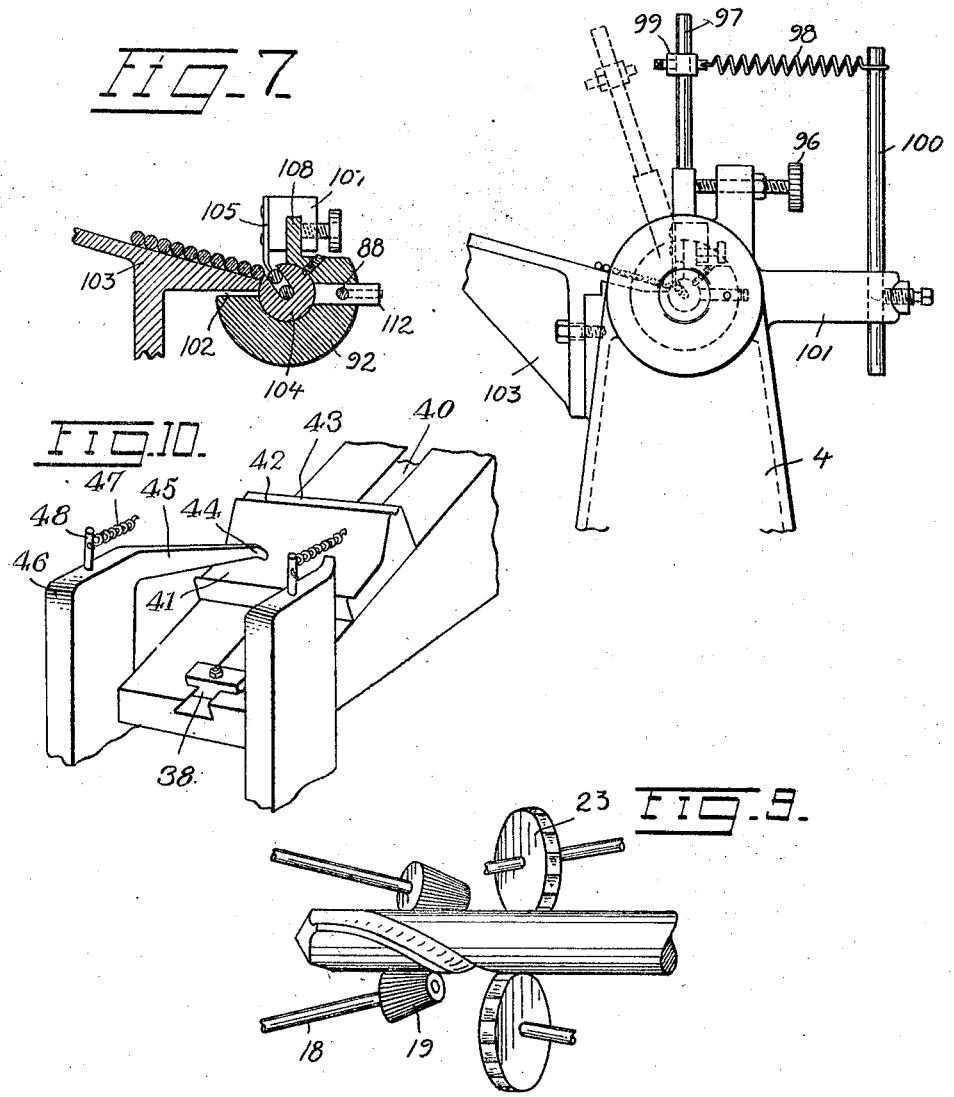

Patented May 25, 1926.

1,585,824

UNITED STATES PATENT OFFICE.

JOHAN ERIK BERGSTRÖM, OF DRESDEN, GERMANY, ASSIGNOR TO GUSTAF STAHLE, OF STOCKHOLM, SWEDEN.

MACHINE FOR PRODUCING OBJECTS WITH MILLED GROOVES.

Application filed August 27, 1921, Serial No. 495,854, and in Germany February 19, 1921.

The present invention relates to a machine for producing objects with milled grooves of various form, where the various movements of the object and the movement of the tool with respect to the object automatically take place.

The invention relates more particularly to the production of spiral bits. By means of the machine spiral as well as rectilinear grooves or also grooves of arbitray direction may be produced, and the depth of the grooves may be constant or variable.

The machine forms the grooves of the bits and is furthermore adjusted for simultaneous automatic milling of the exterior surfaces of the tools so that the necessary clearance for the proper operation of the bit is obtained.

During the production the blank is held in a rotatably and axially movable holder.

In accordance with the invention the feed of the holder with the blank takes place through a passage in the interior of the holder and the advance of a new blank is obtained by means of a spring which is placed under tension upon the return of the feeding mechanism.

In order to regulate the advance of the new blank a brake device with regulatable brake effect, such as a hydraulic brake, is arranged in the mechanism.

The machine comprises the following main parts:

(a) The milling mechanism for clearance with holder and driving means, (b) The main milling mechanism with means for automatic, radial movement of the cutters, (c) The holder (50) for the blanks with means for automatic advance and return movement for the same together with the mechanism for opening the clamping jaws so as to eject the finished work and insert a new blank, (d) The mechanism for advancing a new blank from the magazine.

The invention is shown in the annexed drawings, in which

Fig. 3 is a detail view showing the separate mechanism for adjusting the lower main cutter.

Figure 1:
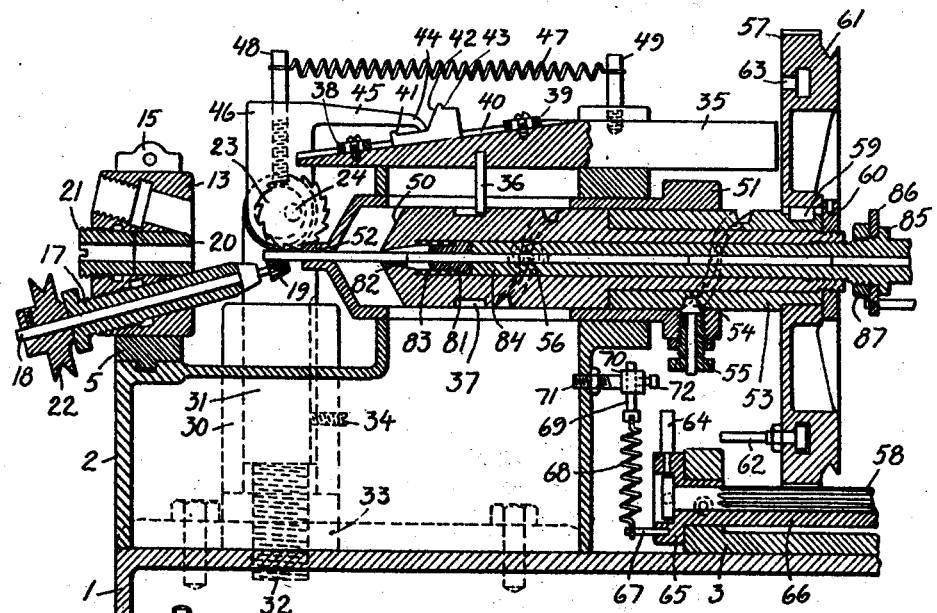
Fig. 1 is a longitudinal section through the front part of the machine.

Fig. 4 discloses the adjusting of the holder for milling-cutters.

Fig. 5 is a detail view showing a coupling device for the actuating mechanism of the holder (50).

Fig. 6 is a horizontal section showing the bearing and adjusting mechanism of one of the main cutters.

Fig. 7 is a detail section through the blank magazine.

Fig. 8 discloses a detail of the mechanism for advancing the blanks to the blank holder and the mechanism for regulating the force necessary for clamping the blank in the holder (50).

Fig. 9 shows diagrammatically the working position of the four tools necessary for the purpose of producing the objects in question in one operation.

Fig. 10 is a detail perspective showing means whereby both holders of the main tools are automatically adjusted during the operation by means of an inclined plane.

In the drawing, 1 designates the machine frame on which are secured, by means of screws, the supporting frames 2, 3 and 4 which carry the various main parts of the machine and of which the frame 4 is adjustable in the longitudinal direction of the machine by means of longitudinal guide grooves. To an inclined portion of the frame 2 a bearing 5 is adjustably secured. The screws 6 and 7 serve for the adjustment of this bearing, which screws coact with fingers 8 and 9 secured to the bearing 5, and which have a limited movement in elongated grooves 10, 11 in the supporting frame 2. To secure the bearing 5 after adjustment the screw 12 is provided. In the bearing 5 a holder 13 for the milling cutters is arranged which cutters serve for finishing the grooves produced by the main cutters and which are arranged rotatably and displaceably. To secure the holder the bearing is provided with ears 14 and 15 in conjunction with a screw 16, which upon being tensioned tightens the bearing 5 about the holder after adjustment of the latter. The holder has apertures which are directed toward one point on the axis and in these openings threaded sleeves 17 are arranged in which the spindles 18, carrying the cutters 19, are disposed. To secure the sleeve 17, a sleeve 20 is provided which has surfaces corresponding to the exterior surfaces of the sleeve 17 and is forced against the sleeve 17 by means of a sleeve 21 provided with threads. The cutters are driven by means of pulleys 22 secured to the spindles 18 by means of set screws.

The main cutters 23 are as especially shown in Fig. 3 secured on shafts 24 which are eccentrically arranged in sleeves 25, which in turn are rotatable and axially displaceable in bearing sleeves 26. The axial adjustment is secured by means of nuts 27, 28. For the drive of the spindles 24, pulleys 29 are provided. The bearings 26 are carried by spindles 31 which are vertically adjustable in sleeves 30 secured to the frame 2. 33 designates nuts in which a part 32 of the spindle 31 provided with threads is so introduced that the bearings 26 may be raised or lowered when the nuts are turned. The adjustment of the standards may be secured by set screws 34. The standards 31 are so arranged that the cutters 23 may be adjusted under different angles to the axis of the work. For the automatic variation during operation of the depth of the main grooves an inclined plane 35 is provided which is moved in the machine frame with relation to the work by being carried along by the holder of the work by means of a pin 36 which enters an annular groove 37. The latter is so dimensioned that the inclined plane has a certain idle movement with respect to the holder. To the upper and lower end, respectively, of the inclined plane abutments 38 and 39 are secured. These abutments are secured to the inclined plane by means of screws which extend through elongated grooves therein in order to render possible a desired adjustment. In the guide grooves 40 of the inclined plane moves a slide block 41 which is formed with a cam portion 42 and rearwardly thereof with a depression 43. The slide block cooperates with a finger 44 of a side arm 45 of the rotary arm 46 which is so connected with the sleeve 25 for the cutter shaft 24 that the cutter, by rotation of the arm 46, is adjusted with respect to the axis of the work. The contact of the finger 44 with the block 41 during movement of the inclined plane is secured by means of a helical spring 47 which is secured at one end to a screw 48 on a rotary arm 46 whereby the same is simultaneously secured to the sleeve 25 and the other end is secured to a pin 49 of the machine frame.

When moving upwards the block 41 will cause a gradually turning of the side arm 45 so that the cutter is lifted correspondingly. When the slide block 41 strikes the block 39 the finger 44 will be lifted along the cam 42 into the recess 43. Hereby the cutter is removed from the blank. When returning the finger 44 will remain in the recess 43 until the slide block strikes against the block 38 and will then be lowered so that the cutter which has during the latter motion been lifted above the blank will come into working contact with the same.

When the holder 50 during cutting is moved forwardly the parts will occupy the position shown in Fig. 1, the block 41 being gradually raised by the inclined plane and the arm 45 being rotated so that the milled main groove is formed with a gradually decreasing depth. When the block 41 bears on the abutment 39 the finger 44 is lifted from the cam surface 42 and drops into the depression 43, whereby the cutter is lifted from the work. Upon rearward movement of the holder 50 the inclined plane is initially not moved until the pin 36 bears against the opposite wall of the annular groove 37. Thereupon the inclined plane is carried along the finger 44 retaining its position in the depression 43 until the block almost at the end of its stroke comes in contact with the abutment 38. Upon continuation of the movement the finger 44 leaves the depression 43 and occupies its operative position.

The cutters 23 are thus lifted clear from the milled grooves of the work during the return movement of the holder 50, i. e., to an extent which corresponds to the cam height 42 plus the height resulting from the idle movement of the inclined plane.

When the holder 50 is moved in opposite direction the inclined plane will remain idle until the pin 36 contacts with the opposite wall of the annular groove 37, whereupon the already described operation is repeated.

The holder 50 for the blank is guided in a fixed sleeve 51 provided with a mouth 52 and upon this holder is rotatably arranged a sleeve 53. The axial movement of the holder 50 is caused by means of a lug 54 which engages with a spiral cam groove in the sleeve. The lug 54 has preferably an elongated cross section for the purpose of being guided in the groove. The lug 54 is arranged so as to turn freely in its bearing sleeve in order to avoid any clamping action. 56 designates a lug similar to the lug 54 and engaging with a cam groove in the holder 50 (not shown) similar to the cam groove in sleeve 53 with which the lug 54 is coacting. Said cam groove in the holder may either have a form in accordance with the groove in the sleeve 53 (as shown) or may have any other form. It is obtained in this manner that it will be possible to mill grooves in the blanks at any angle to the axis. If grooves parallel to the axis of the blank should be milled it will suffice to use a holder 50 having a groove parallel to the axis of the holder. The feeding motion of the blank will in this case be caused by the engagement of the sleeve 53 which is moving forward at the same time as it is rotated.

As to the two cam grooves, one in the sleeve 53 and one in the holders 50, it would not be possible to produce grooves under a slight inclination to the axis of the blank if only one cam groove were used, as the blank would not be moved axially. By using two cam grooves an axial motion of the blank is obtained, also if the blank should not be turned or only be turned to a slight degree. It is clear that special holders 50 must be used for the several forms of bits. If grooves parallel to the axis should be milled, a cam groove parallel to the axis is necessary. If spiral grooves should be milled, a holder 50 having a similar spiral cam groove should be used.

The feed movement takes place by means of a gear 57, whose teeth mesh with the teeth of a toothed roller 58 driven by means of a pulley 59ª. The toothed roller rests eccentrically in a bearing sleeve 66 supported turnably in a frame 3 so that the same may be lifted or lowered in or out of engagement with the tooth-wheel 57 when the sleeve 66 is turned. The gear 57 is secured to the sleeves 50, 53 by means of a key 59 and a nut 60.

The gear 57 is provided with a groove 61 adapted to take up a weighted cable by means of which the backward motion of the holder 50 for a new operation is effected when the feeding motion is to end.

The cable may pass to a conveying pulley and the weight may consist of a chain hanging freely down from the end of the cable so as to act with a gradually decreased force as the chain is being taken up by the ground. Such construction is shown and described in my co-pending application for Letters Patent of the United States for feeding mechanism for machine tools, filed June 9, 1921, Serial No. 476,305. The chain will be lifted again by the motion of the wheel in the opposite direction during the feeding motion of the wheel so as to be clear for the next backward motion. The release of the engagement with the toothed roller 58 takes place by rotation of the eccentric bearing sleeve 66. This rotation is obtained by the engagement of a pin 62 which is adjustably secured in a groove 63 of the gear 57, and which engages a pin 64 secured to the head 65 of the bearing sleeve 66. To this head is also secured a pin 67 to which a spring 68 is fastened, the other end of which is secured to a rod 69 which under regulation of the spring tension may be adjusted in a sleeve 70 and secured by a set screw 72. The sleeve 70 is secured to a pin 71 which has threaded engagement with the machine frame 2. When the bearing sleeve has been rotated sufficiently far from the pin 62 that the spring has passed the center of the sleeve, the spring 68 will effect further rotation until an abutment 73 engages a lateral pin 74. In the highest position a pin 75 contacts with a side pin 76. Also during this adjustment the last portion of the movement take place by means of the spring 68. With the gear 57 and the toothed roller 58 in meshing position, the eccentric bearing sleeve 66 will abut with the pin 76 by means of a pin 75 and with a pressure which corresponds to the toothed pressure and the tension of the spring 68 collectively; in disengaged position the spring alone maintains the position of the pins 73 and 74. The first portion of the return rotary movement takes place preferably by means of a handle 77, which is screwed in a stop ring 78 on the sleeve 66 and may serve for the purpose of turning the sleeve 66. 79 designates a brake device for the tooth wheel 57 at its back position. It may be adjusted by means of a pin 80 fixed by a set screw.

In order to clamp the blank in position a clamping sleeve 81 with clamping fingers 82 is provided which are formed to cooperate with the inner cone of the sleeve 50. The clamping sleeve is advanced into clamping position by means of a sleeve 84 and when the latter is retracted the clamping sleeve is moved from the clamping position by means of a spring 83. The sleeve 84 has threaded engagement with the sleeve 50 at the latter part thereof. 85 designates a flange on the sleeve 84 which bears a ring 86 secured in position by means of a nut 87 screwed thereon. The ring 86 serves for carrying a rod 88 which may participate in the axial movement of the sleeve without, however, preventing rotation of the sleeve. The sleeve 84 is free to rotate relatively to the ring 86. 89 is a bushing provided with external threads and inserted in the rocker 92, and rearward of the bushing is a sleeve 94 provided with a suitable number of coupling teeth 91, said sleeve being shiftable in axial direction by means of a key 95 arranged in an axial groove in the sleeve 94 and maintained under pressure in engagement with the bushing 89 by means of a helical spring 93. The bushing 89 serves for the fine adjustment of the time for the engagement of the teeth 90 and coupling teeth 91. When the return movement approaches the end position, the end of the sleeve 84 is forced into the bushing 89 and the coupling teeth 90 mesh with the teeth 91 after the sleeve 94 has first been shifted back a portion of the way, the teeth approaching one another a certain time until the teeth of the one coupling are opposed to the grooves of the other coupling. Thereupon the sleeve 94 will spring forward under the pressure of a spring 93 and immediately secure proper engagement between the coupling teeth. From this moment on the rotary movement of the sleeve 84 ceases whereas the holder sleeve 50 continues its movement until the gear 57 is stopped by the brake 79. A loosening of the sleeve 84 with respect to the holder 50 is effected by the screw effect so that the clamping sleeve 82 is released. During this loosening period the rocker is fixed while a pin 97, secured to the rocker 92, bears against the adjusting screw 96 and prevents rotation. The finished blank is now loose in the clamping sleeve 81 and may be ejected by the succeeding blank whereupon it is discharged through the opening in the sleeve 51. When thereafter the following blank occupies its position in the clamping sleeve 81 the eccentric bearing sleeve 66 is rotated by means of the grip 77 so that the toothed roller 58 meshes with the gear 57 and feeding commences. The movement of the rocker 92 is limited once by the pin 97 (see Fig. 6) which, when the coupling teeth mesh, bears against the adjusting screw 96 of the frame 4, and then by a spring 98 which with one end is secured to an adjustable sleeve 99 on the arm 97 and at its other end to an adjustable arm 100 which is secured to an arm 101 on the frame 4. It is to be understood that by regulating the spring tension or by simultaneous adjusting of the sleeve 99 on the arms 97 and the arms 100 on the support 101 the rotary angle of the rocker and therewith relative rotation of the sleeves 50 and 84 may be regulated. In the same manner the clamping of the fingers 82 of the clamping sleeve 81 about the blank may be regulated because this clamping is based on the mentioned relative movability between the sleeves 50 and 84.

The rocker 92 has an angular recess 102 in which a table 103 adapted to receive the blanks may be adjusted up to the blank holder 104. 105 and 106 designate two fingers which by means of clamping bails 107 are secured to one edge 108 of the rocker so that they may be adjusted corresponding to the length of the blanks to be introduced into the holder 104. Upon rotation of the rocker a blank is caused to slide into the feed opening of the holder; however, its complete advance to the center is prevented by a pin 109. The pin 109 is arranged on a piston 110 provided on a piston rod 111. The piston 110 cooperates with a finger 112 of the rod 88. The finger 112 has an arm 113 which is arranged for co-operation with an adjustable conical abutment ring 114 on the rocker 92 in such manner that the finger 112 is forced out of engagement with the piston and the pin 109 may be then again shifted forwardly. The required resiliency will be present by reason of the length of the rod 88.

Figure 2:
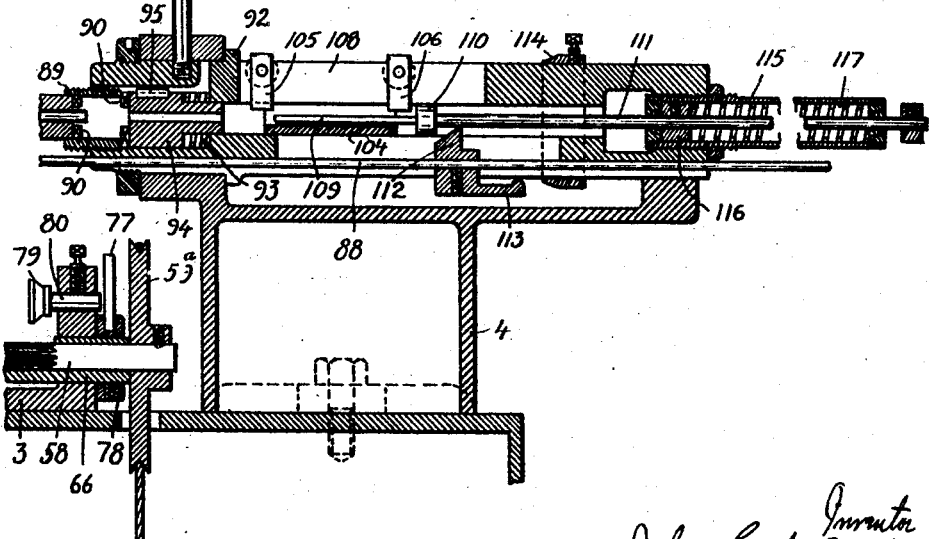
Fig. 2 is a longitudinal section of the rear part of the same.

The rod 88 may be arranged underneath the piston rod 111 (as shown in Fig. 2) but it is preferred to arrange the same beside the rod 111 (as shown in Fig. 7).

In the rocker 92 a spring cylinder 115 is provided through which the rod 111 extends, there being sealing means at the ends of the cylinder to render the same waterproof. To the rod 111 in the cylinder 115 a piston 116 is secured which is subjected to the influence of a spring 117. The cylinder is filled with a suitable liquid which during the movement of the piston flows past the same so as to obtain the necessary braking of the movement. The bore cylinder at various places has a slightly different diameter in order to regulate the brake effect so that the same, for instance, is larger in the vicinity of the end positions of the piston than in the center of a piston stroke.

The machine operates in the following manner:

When the sleeve 84 is returned, the finger 112 will carry along a piston 110 and return the same under compression of the spring 117 in the cylinder 115 until the pin 109 will be in back of the feed opening to the path of the blanks, whereupon a new blank will drop down and arrange in front of the pin 109. This will take place while the clamping sleeve 81 is in retracted position in the sleeve 50 so that a new blank may be introduced therein freely. As soon as the arm 113 bears against the ring 114, the finger 112 will be free from contact with the piston 110 and the spring 117 will then shift the series of blanks about the length of the blanks. As soon as the sleeve 50 starts to rotate in opposite direction the coupling teeth 91 will cause the sleeve 84 to be threaded thereinto with the force constituted by the tension of the spring 98. This tension accordingly determines the clamping of the forward blanks in the clamping sleeve. When the coupling teeth 90 are demeshed from the teeth 91, the sleeves 50 and 84 will move collectively forwardly to thereby bring the blank into operative position, which is subjected to the operation of the cutters 23 and 19 while the sleeve 50 is rotated in a movement which corresponds to the form of the desired groove. When the foremost position has been attained the cutters 23 are released and the return movement begins. The blank operated on is first secured in position so that the entire series of blanks is forced backwards until the teeth 90 again mesh with the teeth 91, whereupon the sleeve 84 with respect to the holder 50 is screwed outwards so that the clamping sleeve releases the forward blank and a new blank is introduced into the blank holder. In case the groove in the holder 50 forms a small angle with the axis of the blank or even runs parallel thereto, the screw connection of the sleeve 84 is preferably provided together with the sleeve 53 in order to obtain sufficient rotation for loosening and tightening.

It is obvious that many of the details shown are indicated by way of example and that they may be changed in any desired manner within the scope of the invention.

No claim is made herein for the feeding mechanism, as the same is described and claimed in my co-pending application, Serial No. 476,305 hereinbefore referred to.

No claim is made herein for the inclined support or holder 13 and associated mechanism, as the same is described and claimed in Letters Patent of the United States for milling machines, No. 1,456,756, dated May 29, 1923, and granted to me on an application filed January 24, 1921, Serial No. 439,669.

I claim:

1. Automatic machine for the production of spiral bits and other article with milled grooves, characterized by the combination of two main cutters arranged diametrically to the blank so as to cut opposite main grooves in the blank, two clearance cutters nearer to the point of the blank in order that a spiral bit or the like may be finished after a single passage through the machine, an inclined plane to regulate the depth of the main cutters and a blank holder to move the same, said inclined plane having a slide block with which an arm of the cutter bearing has contact, said slide block cooperating with abutments of the inclined plane and having such a form that the mentioned arm at the end of the groove in one position is lifted onto the block and remains there during the return movement of the inclined plane.

2. Automatic machine, as set forth in claim 1, characterized thereby that the drive mechanism for the holder comprises a gear which cooperates with an eccentrically arranged gear, it causing at the end of the operative movement a rotation of the bearing sleeve of the last mentioned gear so that it is released from engagement for the purpose of returning the main gear, which main gear has connection with the holder which receives the desired rotation during the advance movement by means of a finger entering a groove therein.

3. Automatic machine as set forth in claim 1, characterized by a feed mechanism which comprises a drive rod subjected to the influence of a spring which may be tensioned by returning the rod by means of a finger engaging a rod connected to the holder in order to advance the series of blanks after release of the finger, the feed mechanism being provided with a brake cylinder so that a manifold brake effect may be present under the various phases of operation.

4. Automatic machine as set forth in claim 1, characterized by a feed mechanism which comprises a drive rod subjected to the influence of a spring which may be tensioned by returning the rod by means of a finger engaging a rod connected to the holder in order to advance the series of blanks after release of the finger, the feed mechanism being provided with a brake cylinder so that a manifold brake effect may be present under the various phases of operation.

In witness whereof I affix my signature.

JOHAN ERIK BERGSTRÖM.